(12) United States Patent
Duke et al.

(10) Patent No.: US 9,396,347 B2
(45) Date of Patent: Jul. 19, 2016

(54) PROVIDING STATUS OF SITE ACCESS REQUESTS

(75) Inventors: Bojana Marjanovic Duke, Seattle, WA (US); Ajey Pankaj Shah, Redmond, WA (US); Reed George Pankhurst, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1017 days.

(21) Appl. No.: 13/223,741

(22) Filed: Sep. 1, 2011

(65) Prior Publication Data

US 2013/0061295 A1 Mar. 7, 2013

(51) Int. Cl.
*G06F 21/62* (2013.01)

(52) U.S. Cl.
CPC ................................ *G06F 21/6209* (2013.01)

(58) Field of Classification Search
USPC ........... 713/164–167, 189–194; 726/5, 27–30
See application file for complete search history.

(56) References Cited

U.S. PATENT DOCUMENTS

| | | | | |
|---|---|---|---|---|
| 5,524,235 A * | 6/1996 | Larson et al. ................. | 711/151 |
| 5,819,105 A * | 10/1998 | Moriarty et al. ................. | 710/5 |
| 6,209,067 B1 * | 3/2001 | Collins et al. ................. | 711/158 |
| 6,898,619 B1 * | 5/2005 | Tran ................. G06F 17/30902 | 705/26.1 |
| 6,934,823 B2 * | 8/2005 | Williams et al. ............... | 711/167 |
| 7,587,678 B1 * | 9/2009 | English ................. G06Q 10/107 | 709/206 |
| 7,792,861 B2 | 9/2010 | Kudoh et al. | |
| 2002/0004844 A1 * | 1/2002 | Harari ................. G06Q 10/10 | 709/238 |
| 2002/0032665 A1 * | 3/2002 | Creighton et al. ............... | 705/76 |
| 2002/0049907 A1 | 4/2002 | Woods et al. | |
| 2002/0053082 A1 * | 5/2002 | Weaver, III ......... H04L 12/1836 | 725/46 |
| 2003/0187995 A1 * | 10/2003 | Fok et al. ....................... | 709/227 |
| 2003/0215067 A1 * | 11/2003 | Ordille ............. G06F 17/30864 | 379/88.13 |
| 2005/0125456 A1 * | 6/2005 | Hara et al. ..................... | 707/200 |
| 2006/0031333 A1 * | 2/2006 | O'Neill ................ G06Q 10/107 | 709/206 |
| 2006/0069596 A1 * | 3/2006 | Hatoun et al. .................... | 705/7 |
| 2006/0070020 A1 * | 3/2006 | Puttaswamy .......... G06Q 10/10 | 717/101 |
| 2006/0086799 A1 * | 4/2006 | Robertson ............ G06Q 10/107 | 235/462.1 |
| 2006/0149730 A1 | 7/2006 | Curtis | |
| 2007/0038765 A1 * | 2/2007 | Dunn ............................ | 709/229 |

(Continued)

OTHER PUBLICATIONS

Zhong et al., "Authentication-Driven Authorization on Web Access," Jul. 26, 2002, CERIAS Tech Report 2001-17, 8 pages.

(Continued)

*Primary Examiner* — Taghi Arani
*Assistant Examiner* — Phy Anh Vu
(74) *Attorney, Agent, or Firm* — Julie Kane Akhter; Tom Wong; Micky Minhas

(57) ABSTRACT

Concepts and technologies are described herein for providing status of site access requests. In accordance with the concepts and technologies disclosed herein, a user attempts to access functionality of a server application that is limited to authorized users. In response to the access attempt, the server application determines if the user is authorized to access the functionality and if the user has previously requested access to the functionality. If the user has not previously requested access to the application, the server application can present a user interface to the user for requesting access to the server application. If the user has previously requested access to the application, the server application can present an indication that an access request already exists, history and status information associated with the access request, and/or an interface for submitting messages to the site owner or other entity.

19 Claims, 6 Drawing Sheets

(56) References Cited

U.S. PATENT DOCUMENTS

| | | | |
|---|---|---|---|
| 2008/0005248 A1* | 1/2008 | Fink | G06F 17/3089 |
| | | | 709/206 |
| 2008/0120302 A1* | 5/2008 | Thompson | G06F 21/6209 |
| 2008/0216092 A1* | 9/2008 | Serlet | H04L 51/02 |
| | | | 719/315 |
| 2008/0263162 A1* | 10/2008 | Staiman | G06Q 10/06 |
| | | | 709/206 |
| 2009/0293105 A1 | 11/2009 | Urakawa et al. | |
| 2010/0017889 A1 | 1/2010 | Newstadt et al. | |
| 2010/0041372 A1 | 2/2010 | Linkola et al. | |
| 2012/0246703 A1* | 9/2012 | MacLeod | G06Q 10/107 |
| | | | 726/4 |

OTHER PUBLICATIONS

"MicroMain Web Request," downloaded Apr. 20, 2011 from http://www.micromain.com/XMweb.asp, 2 pages.

* cited by examiner

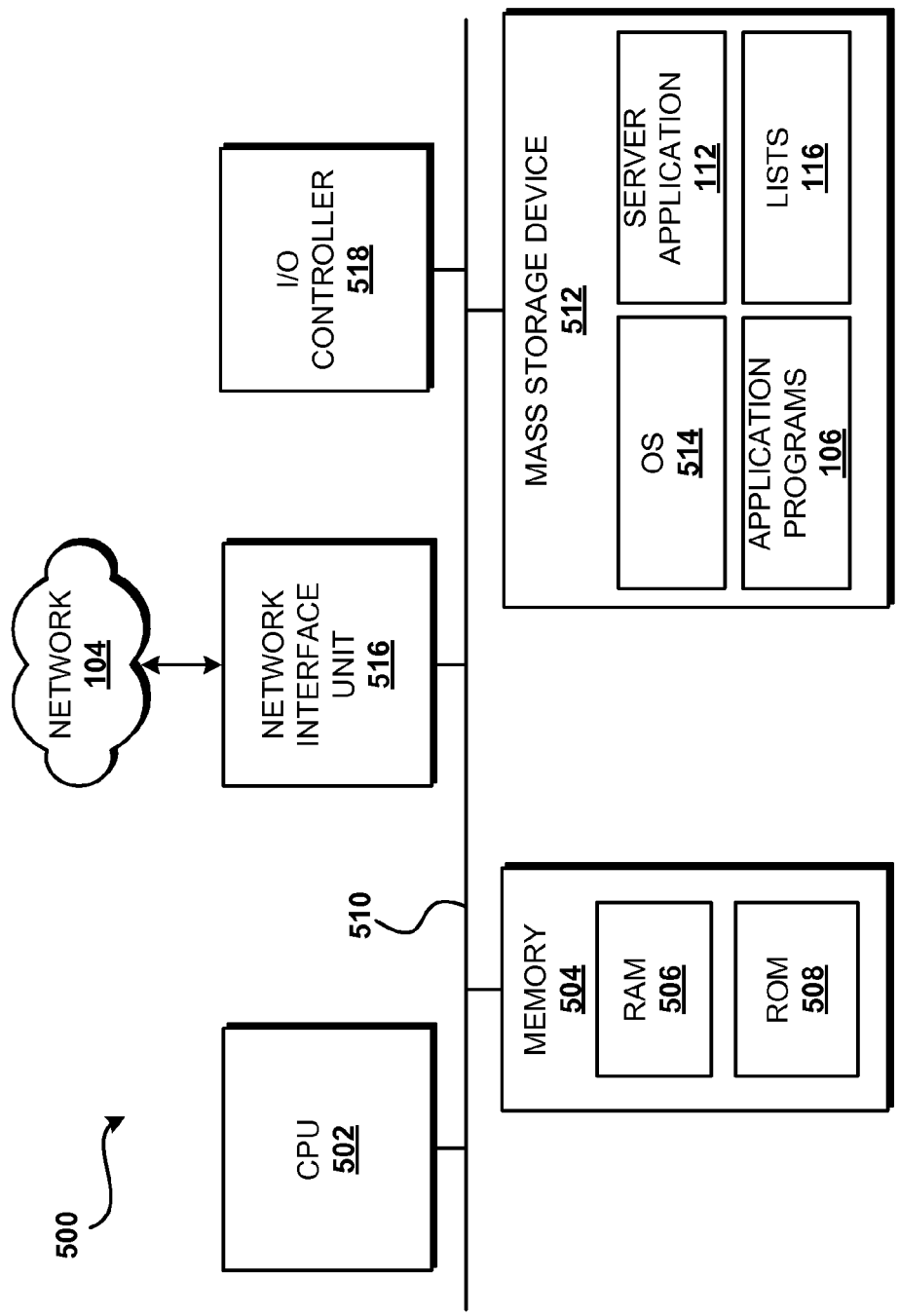

PROVIDING STATUS OF SITE ACCESS REQUESTS

BACKGROUND

In some application environments, application functionality is hosted by a server or other device. These applications can restrict a user's access to functionality associated with the application based upon a user's identity and/or other considerations. In some instances, a user may request access to restricted functionality or applications. In other instances, users can generate access requests on behalf of other users. These access requests may be placed into a queue for consideration by a site owner or other entity.

During consideration of the access request, the site owner or other entity may have questions for the user requesting access. The site owner or other entity, however, may be unable to request the information from the user without exposing his or her identity, for example, by sending an email to the user. In some instances, the site owner or other user may not wish to expose his or her identity to the users and therefore may deny the user's access request or may decide not to act upon the access request.

Additionally, a user who has requested access to a site, application, or other resource may return after creating an access request. The user may unsuccessfully attempt to access the site or application if his or her access request has not yet been approved. The user may interpret this unsuccessful access attempt as resulting from an un-received or denied access request. Thus, the user may resubmit the access request or may wish to communicate with the site owner or other entity to obtain additional information. Thus, the user may generate superfluous requests that require review by the site owner or other entity.

It is with respect to these and other considerations that the disclosure made herein is presented.

SUMMARY

Concepts and technologies are described herein for providing status of site access requests. In accordance with the concepts and technologies disclosed herein, some functionality of a server application hosted by a server computer may be limited to authorized users. If a user attempts to access the functionality of the server application that is limited to authorized users, the server application can determine if the user is authorized to access the functionality. If the user is not authorized to access the functionality of the server application, the server application can determine if the user has previously requested access to the functionality.

If the user has not previously requested access to the application, the server application can present a user interface to the user for requesting access to the server application. The user can generate an access request via the user interface. Data corresponding to the access request can be stored in a data file stored at the server computer and a status update can be generated and sent to the user requesting the access request. According to some embodiments, status updates also can be sent to a site owner or other entity. The status updates sent to the site owner can be used to inform the site owner that a user has requested access. Similarly, the site owner can generate status updates that are delivered to the server application. For example, the site owner may generate the status updates by accepting or denying an access request or by generating messages for the user requesting the access.

If the user has previously requested access to the application, the server application can present a user interface to the user. In some embodiments, the user interface presented to the user indicates that an access request exists. The user interface also can present history and status information associated with the access request and/or an interface for submitting messages to the site owner or other entity. Thus, the user can be provided a current status and history associated with the access request and can be prevented from creating a new access request.

In some embodiments, the requests, history data, and/or status information are stored in the data file at the server computer. The server computer can generate status updates for the user regarding the access requests. For example, the server computer can generate emails, other electronic messages, and/or other status updates for communication to the user, if desired. As such, the user can be kept updated as to the status of his or her access request when the user attempts to access the application and/or when activity associated with the access request is detected by the server computer.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram illustrating an illustrative computer hardware and software architecture for a computing system capable of implementing aspects of the embodiments presented herein.

DETAILED DESCRIPTION

Figure 1:
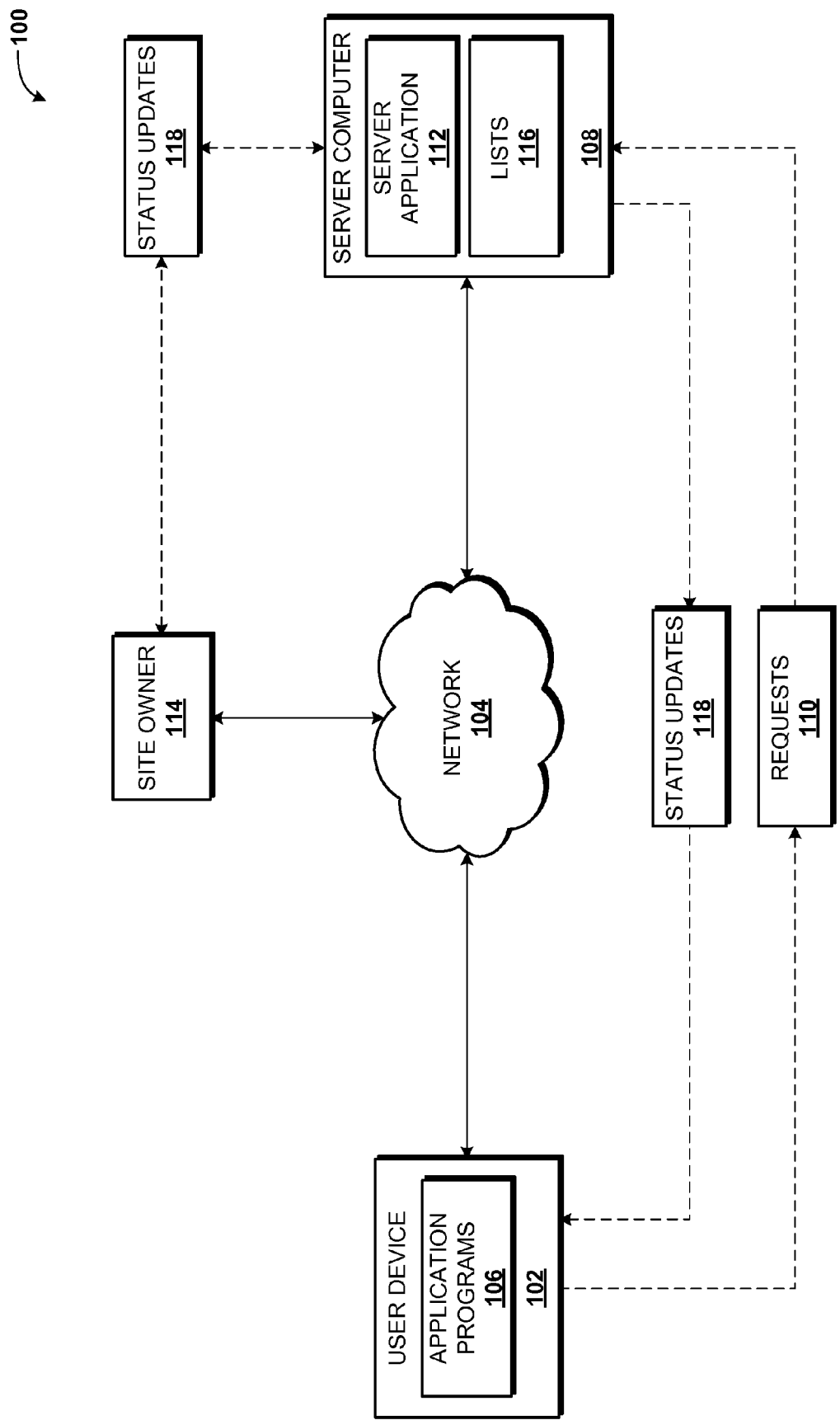
FIG. 1 is a system diagram illustrating an operating environment for the various embodiments disclosed herein, according to an illustrative embodiment.

The following detailed description is directed to concepts and technologies for providing status of site access requests. According to the concepts and technologies described herein, a user attempts to access functionality of a server application hosted by a server computer. The functionality may be limited to authorized users. In response to the access attempt, the server application can determine if the user is authorized to access the functionality. Authorized users can be allowed to access the functionality while users who are not authorized to access the functionality of the server application can be presented with user interfaces for requesting access and tracking status and history associated with the access requests.

The server application can determine if the user has previously requested access to the functionality. If the user has not previously requested access to the application, the server application can present a user interface to the user for requesting access to the server application. Data corresponding to the access request can be stored in a data file at the server computer. In some embodiments, the server computer also can be configured to transmit status updates or other information to the user and/or a site owner.

If the user has previously requested access to the application, the server application can present a user interface to the user. The user interface presented to the user can indicate that an access request already exists and can be used to present history and status information associated with the access request. The user interface also can provide an interface for submitting messages to the site owner or other entity. Thus, the user can be provided a current status and history associated with the access request, can be allowed to communicate with the site owner or other entity via an approved medium, and/or can be prevented from creating a new access request. As such, the user can be kept updated as to the status of his or her access request when the user attempts to access the application and/or when activity associated with the access request is detected by the server computer.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing status of site access requests will be presented.

Referring now to FIG. 1, aspects of one operating environment 100 for the various embodiments presented herein will be described. The operating environment 100 shown in FIG. 1 includes a user device 102 operating on or in communication with a communications network ("network") 104. According to various embodiments, the functionality of the user device 102 is provided by a personal computer ("PC") such as a desktop, tablet, or laptop computer system. The functionality of the user device 102 also may be provided by other types of computing systems including, but not limited to, server computers, handheld computers, netbook computers, embedded computer systems, personal digital assistants, mobile telephones, smart phones, workstations, or other computing devices.

The user device 102 is configured to execute an operating system (not illustrated) and one or more application programs 106. The operating system is a computer program for controlling the operation of the user device 102. The application programs 106 are executable program configured to execute on top of the operating system to provide various types of functionality. According to various implementations, the application programs 106 include, for example, a web browser, a stand-alone application, and/or other application programs for providing the functionality described herein. In one embodiment, the application programs 106 includes a web browser for interacting with a server computer 108, as will be described in more detail herein.

According to various embodiments, the application programs 106 are configured to generate requests 110. In some implementations, for example, the application programs 106 create and transmit the requests 110 to the server computer 108. In other embodiments, the user device 102 interacts with the server computer 108 to create the requests 110 at the server computer 108. Thus, while FIG. 1 illustrates the requests 110 being transmitted to the server computer 108, it should be understood that the requests 110 may be created at the server computer 108 via interactions occurring at the server computer 108. Thus, the illustrated embodiment is illustrative and should not be construed as being limited in any way.

In some embodiments, the server computer 108 is configured to execute the server application 112 to provide a hosted software environment. In some embodiments, the server computer 108 is configured to execute the server application 112 to provide functionality associated with an online collaboration software package. For example, in some embodiments, the server application 112 hosted by the server computer 108 corresponds to a member of the SHAREPOINT family of collaboration products available from MICROSOFT CORPORATION in Redmond, Wash. Because the server computer 108 can be configured to host any desired software, application program, or other computer-executable code, it should be understood that this embodiment is illustrative, and should not be construed as being limiting in any way.

The server application 112 can be further configured to receive and manage site access requests, and to provide status of site access requests. The site access requests can be received as or generated as the requests 110 described herein. The requests 110 can be managed at the server computer 108 by the server application 112, as will be described herein in additional detail. For example, in some embodiments, the server application 112 determines if a user attempting to access functionality with the server application 112 is authorized to do so, to generate a user interface ("UI") for enabling the user to request access if the user is not authorized to access the server application 112, and to allow the user to track status of the access requests as will be explained in more detail below with reference to FIGS. 2-4. Additionally, the server application 112 can be configured to provide a UI for a site owner, site operator, webmaster, site manager, or other entity ("site owner") 114 to review and manage received access requests, as will be explained in more detail below with reference to FIGS. 2-4. As shown in FIG. 1, the site owner 114 can, but does not necessarily, communicate with the server application 112 via the network 104.

The server application 112 also can be configured to store data associated with the access request. In some embodiments, the data is stored as the lists 116. In some embodiments, for example, the lists 116 can correspond to SHAREPOINT lists, which are generally understood and therefore are not described in additional detail herein. While the present disclosure describes the data being stored as the lists 116, it should be understood that other forms of data can be stored instead of, or in addition to the lists 116. Thus, the illustrated embodiments should be understood as being illustrative, and should not be construed as being limited in any way.

If a user attempts to access the server application 112, the server application 112 can be configured to determine if the user is authorized to access the server application 112 based upon authentication data, cookies, and/or other mechanisms. If the user is not authorized to access the server application 112, the server application 112 can determine if the user has submitted or otherwise is associated with an existing access request. If so, the server application 112 can read the lists 116 to obtain information corresponding to the access request to provide history and/or status information to the user. The lists 116 can store data describing when the access request was created, the party that created the access request, the permission level requested, message exchanges between the user and the site owner 114 or other entity, and/or other information associated with the access request.

In some embodiments, the server application 112 is configured to generate status updates 118 for communicating status information to the user or other entity associated with the user device 102. In some embodiments, for example, the status updates 118 are provided via a UI. In other embodiments, the status updates 118 correspond to emails or other electronic messages that are communicated to the user device 102 or other devices such as mail servers and the like. Illustrative UIs for requesting access and presenting the status updates 118 to the user are described herein with reference to FIGS. 3A-4.

According to some implementations of the operating environment 100, the server application 112 is also configured to communicate with the site owner 114. According to various implementations, the server application 112 generates status updates 118 for informing the site owner 114 that a user or other entity has requested access to the server application 112. Thus, a site owner 114 can be informed each time a new access request is received by the server application 112. In some embodiments, the status updates 118 are generated once a day, once a week, once a month, or at other intervals. Thus, the site owner 114 can act upon access requests once a period in addition to, or instead of, receiving the status updates 118 each time an access request is received. Using periodic status updates 118 can, in some embodiments, help reduce the amount of communications between the server application 112 and the site owner 114, though this is not necessarily the case.

The site owner 114 also can generate status updates 118 that are delivered to the server application 112. For example, the site owner 114 can approve or deny an access request. In response to the approval or denial, the site owner 114 can generate a status update 118 that informs the server application 112 of the action taken by the site owner 114. Similarly, the site owner 114 can generate one or more messages for the user requesting the access. These messages also can be transmitted to or via the server application 112 as the status updates 118. It should be understood that this embodiment is illustrative, and should not be construed as being limiting in any way.

FIG. 1 illustrates one user device 102, one network 104, one server computer 108, and one site owner 114. It should be understood, however, that some implementations of the operating environment 100 include multiple user devices 102, multiple networks 104, multiple server computers 108, and/or multiple site owners 114. Thus, the illustrated embodiment should be understood as being illustrative, and should not be construed as being limiting in any way.

Figure 2:
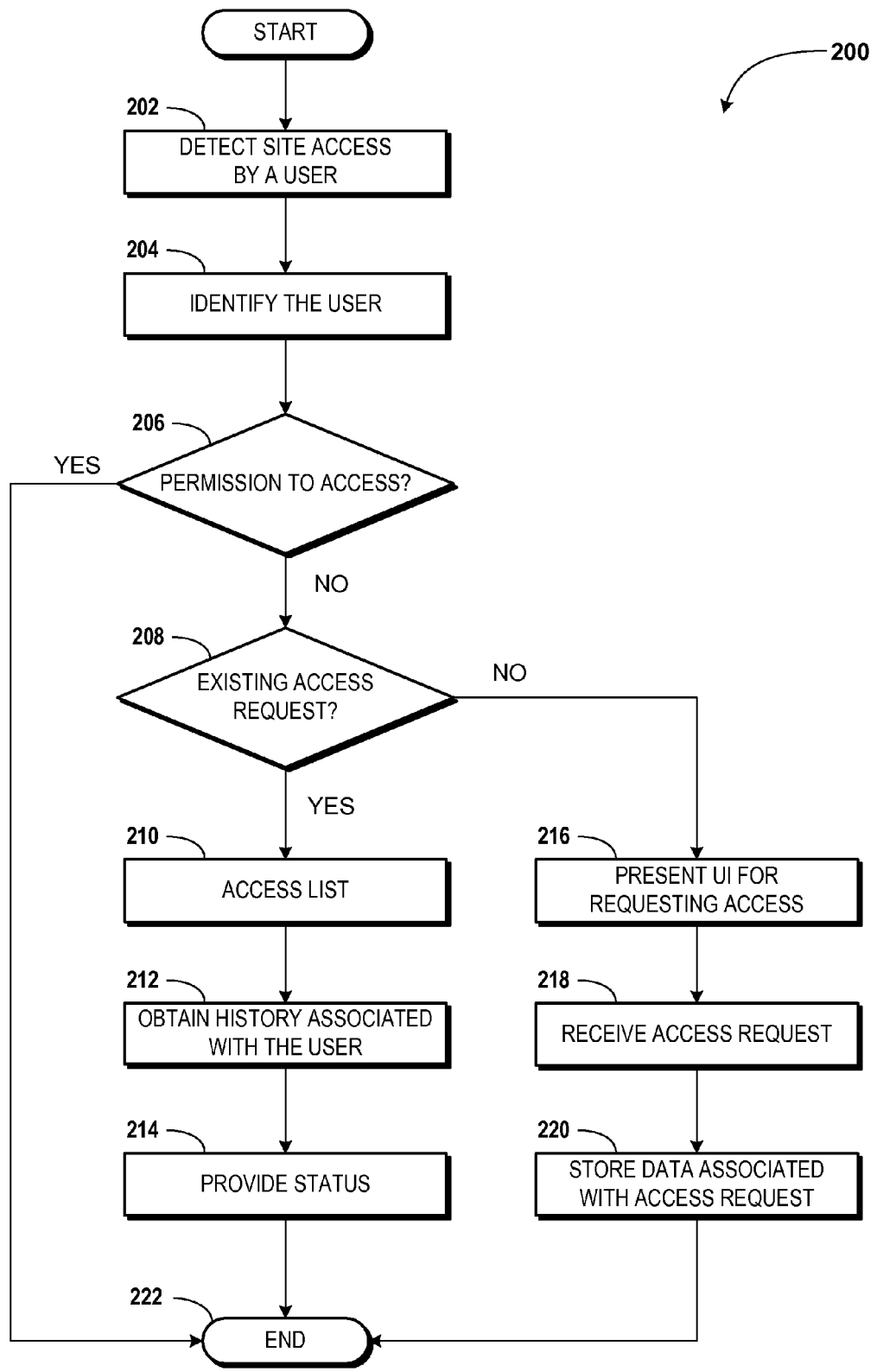
FIG. 2 is a flow diagram showing aspects of a method for providing status of site access requests, according to an illustrative embodiment.

Turning now to FIG. 2, aspects of a method 200 for providing status of site access requests will be described in detail.

It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the server computer 108 via execution of the server application 112. In other embodiments, the method 200 is performed by other devices and/or via execution of other application programs or modules. As such, it should be understood that the described embodiments are illustrative, and should not be viewed as being limiting in any way.

The method 200 begins at operation 202, wherein the server computer 108 detects site access by a user. In some embodiments, the server application 112 supports interactions with any number of users or user devices 102 and can be configured to recognize access of the server application 112 by the users or user devices 102. In some embodiments, for example, a user authenticates with the server application 112 to access functionality associated with the server application 112. Thus, operation 202 can include detecting execution of an authentication process by a user or user device 102, if desired. Other embodiments for detecting site access by a user or user device 102 are possible and are contemplated.

From operation 202, the method 200 proceeds to operation 204, wherein the server computer 108 identifies the user. As mentioned above, the server computer 108 can identify a user based upon an authentication process. In other embodiments, the server computer 108 can use cookies, tokens, and/or other processes to identify users accessing the server computer 108. For purposes of describing the various embodiments disclosed herein, the method 200 is described as using an authentication process such as a login or sign-in process to identify the user. Based upon the above description, it should be understood that this embodiment is illustrative, and should not be construed as being limiting in any way.

From operation 204, the method 200 proceeds to operation 206, wherein the server computer 108 determines if the user has permission to access the server application 112. If the server computer 108 determines, in operation 206, that the user has permission to access the server application 112, the method 200 can end and the server computer 108 can allow the user to access the server application 112. If the server computer 108 determines, in operation 206, that the user does not have permission to access the server application 112, the method 200 proceeds to operation 208.

In operation 208, the server computer 108 determines if the user has requested access to the server application 112. If the server computer 108 determines, in operation 208 that the user has requested access to the server application 112, the method 200 proceeds to operation 210, wherein the server computer 108 accesses one or more of the lists 116 to determine the status of the access request associated with the user. As mentioned above, the lists 116 are illustrative of one contemplated data file for storing the data corresponding to the access requests and should not be construed as being limiting in any way.

From operation 210, the method 200 proceeds to operation 212, wherein the server computer 108 obtains a history associated with the user. The history obtained in operation 212 corresponds to a history of the user's access request determined to exist in operation 208. As mentioned above, the lists 116 or other data files can store information associated with one or more users and their associated access requests. The lists 116 can store, for example, data indicating a time at which access was requested by the user, communications between a site owner 114 and the user, and/or other information associated with the access request. Thus, the server computer 108 can obtain, in operation 212, a status and history of the access request determined to exist in operation 208.

From operation 212, the method 200 proceeds to operation 214, wherein the server computer 108 provides a status of the access request to the user. In some embodiments, the server computer 108 prepares a UI for display to the user for displaying the status and/or associated history for the user. An example UI for presenting a status and/or history to the user is illustrated and described below in FIG. 3A. Additionally, or alternatively, the server computer 108 can generate a report that is transmitted to the user. In some embodiments, for example, the server computer 108 generates and sends an email or other electronic message to the user detailing a status and/or history associated with the access request to provide a status of the site access request to the user.

If the server computer 108 determines, in operation 208 that the user has not requested access to the server application 112, the method 200 proceeds to operation 216. In operation 216, the server computer 108 can generate and/or present a UI to the user for requested access to the server application 112. An example of a UI for requesting access to the server application 112 is illustrated and described below with reference to FIG. 3B.

From operation 216, the method 200 proceeds to operation 218, wherein the server computer 108 receives an access request. As explained above, the access request can be received via a UI presented by the server computer 108. From operation 218, the method 200 proceeds to operation 220, wherein the server computer 108 stores data corresponding to the access request and/or a status of the access requests in the lists 116. The data stored in operation 220 can indicate the time the access request was created as well as any subsequent history associated with the request, as explained herein. From operations 206, 214, and 220, the method 200 proceeds to operation 222. The method 200 ends at operation 222.

Although not explicitly shown in FIG. 2, some embodiments of the concepts and technologies disclosed herein include generating status updates 118 when the server computer 108 receives an access request. As mentioned above with reference to FIG. 1, the server computer 108 can be configured to communicate with a site owner 114. Thus, for example, the server computer 108 can generate the status updates 118 when the server computer 108 receives an access request. As such, the site owner 114 may be relieved, in some embodiments, from being required to periodically determine if any access requests have been received, as the server computer 108 can be configured to generate a status update 118 each time an access request is received.

In some implementations, the server computer 108 is configured to generate a status update 118 periodically instead of, or in addition to, generating the status updates 118 when access requests are received. Thus, the server computer 108 can be configured to generate hourly, daily, or weekly status updates 118 that inform the site owner 114 of any access requests received. Because the server computer 108 can be configured to generate the status updates 118 at any time or specified period, it should be understood that these embodiments are illustrative, and should not be construed as being limiting in any way.

Furthermore, as mentioned above, the site owner 114 can generate status updates 118 that are delivered to the server computer 108 for approving the access request, for denying the access request, and/or for generating messages to users requesting access to the server computer 108. Thus, although not shown explicitly in FIG. 2, the server computer 108 can receive status updates 118 from a site owner 114 for acting on the access requests.

Figure 3A:
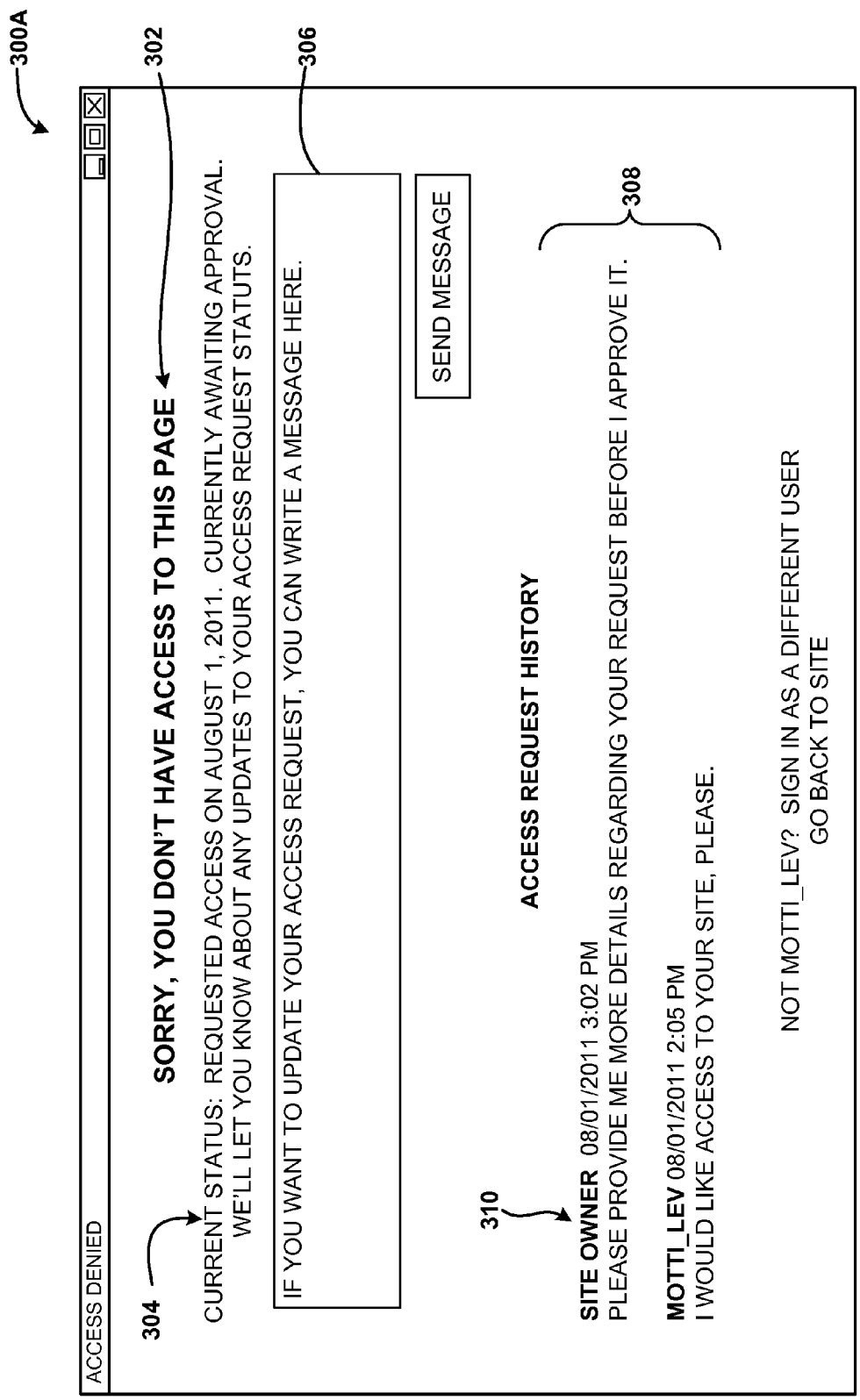
FIGS. 3A-3B are user interface diagrams showing aspects of illustrative user interfaces for presenting status of site access requests, according to various embodiments.

Turning now to FIG. 3A, a UI diagram showing aspects of a UI for presenting status of site access requests in some embodiments will be described. As explained above with regard to FIG. 2, the UI illustrated in FIG. 3A can be, but is not necessarily, presented in operation 214 of the method 200, if desired. In particular, FIG. 3A shows a screen display 300A generated by the server computer 108 to present a history and/or status of a site access request associated with a user in response to determining that a user lacks permission to access the server application 112 and determining that the user has an existing access request. It should be appreciated that the UI diagram illustrated in FIG. 3A is illustrative of one contemplated embodiment, and therefore should not be construed as being limited in any way.

The screen display 300A shown in FIG. 3A is configured to present a permission indication 302 that indicates that the user lacks permission to access the requested page. As explained herein, the requested page can correspond to functionality associated with the server application 112 in general and/or particular functionality provided by the server application 112. As shown, the permission indication 302 can include a current status indicator 304 for providing a status of a pending access request. In the illustrated embodiment, the current status indicator 304 indicates that a site access request has been generated, the time the access was requested, and a current status of the request.

The screen display 300A also includes a message box 306 for submitting messages to a site owner 114 or other entity who reviews site access requests. Thus, in some embodiments, a user can send messages to the site owner 114 supplementing a site access request, requesting a status update, and/or for other reasons. Thus, use of the example UI illustrated in FIG. 3A can be used to prevent users from submitting duplicate access requests, in some embodiments.

The screen display 300A also displays a history 308 of the access request. As shown in FIG. 3A, the history 308 can include messages exchanged between the site owner 114 or other entity and the user. For example, the history 308 includes a message 310 from the site owner 114 or other entity requesting additional details from the user regarding why access is being requested. It should be understood that the user can respond to the message 312 via interactions with the text box 306, if desired. It should be understood that this embodiment is illustrative, and should not be construed as being limiting in any way.

Figure 3B:
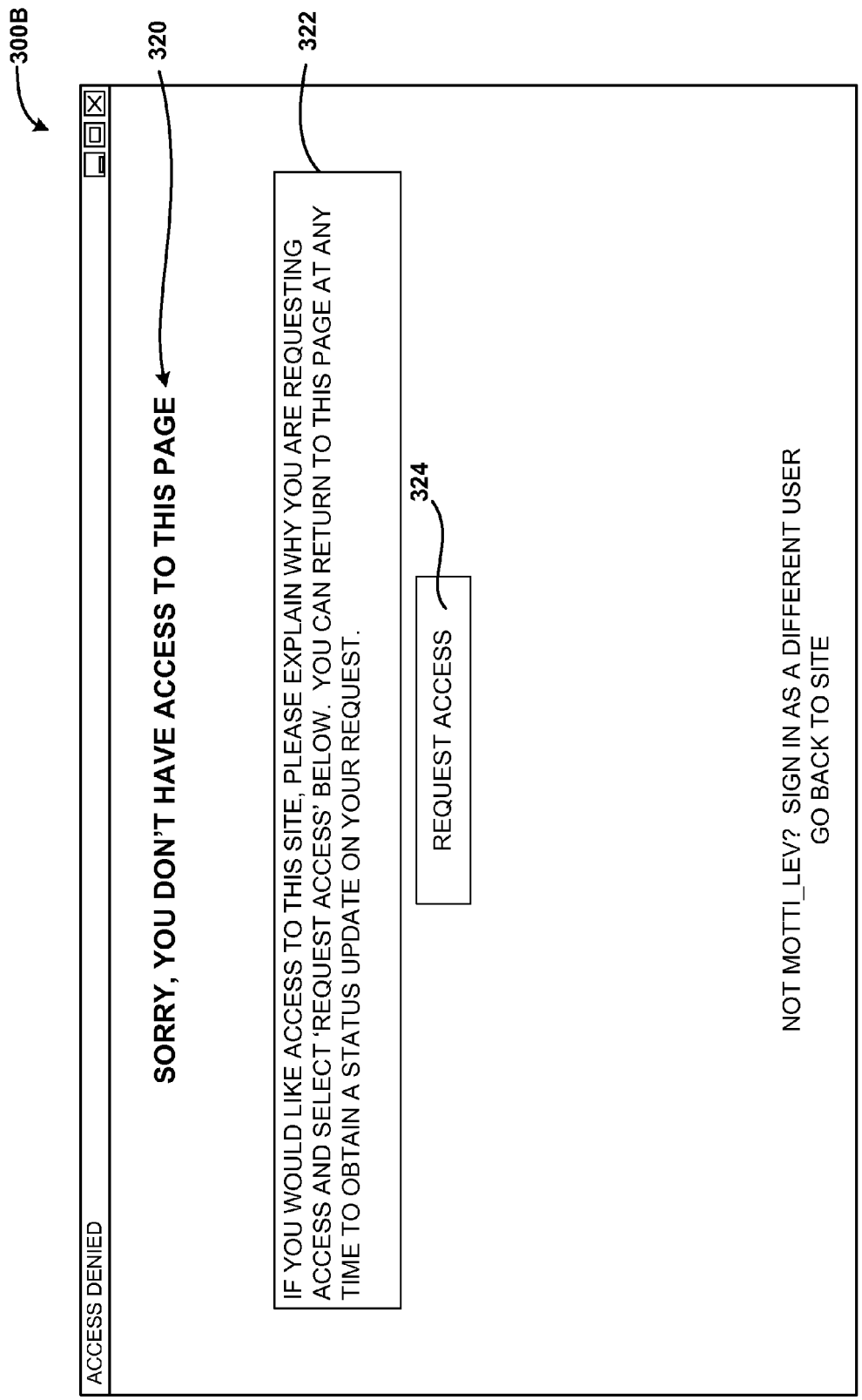

Referring now to FIG. 3B, a UI diagram showing aspects of a UI for presenting status of site access requests in some embodiments will be described in detail. As explained above with regard to FIG. 2, the UI illustrated in FIG. 3B can be, but is not necessarily, presented in operation 216 of the method 200, if desired. In particular, FIG. 3B shows a screen display 300B generated by the server computer 108 to present a UI for informing a user that he or she lacks permission to access a site and/or to permit the user to request access to the site in response to determining that a user lacks permission to access the server application 112 and determining that the user does not have an existing access request. It should be appreciated that the UI diagram illustrated in FIG. 3B is illustrative of one contemplated embodiment, and therefore should not be construed as being limited in any way.

The screen display 300B shown in FIG. 3B is configured to present a permission indication 320 that indicates that the user lacks permission to access the requested page. It should be understood that the permission indication 320 can be, but is not necessarily, substantially similar to the permission indication 302 presented in the UI illustrated in FIG. 3A. Furthermore, the requested page can correspond to functionality associated with the server application 112 in general and/or particular functionality provided by the server application 112, as explained above.

The screen display 300B also can include a text box 322 for use by a user to submit a message to a site owner 114 or other entity. As shown in FIG. 3B, the user can use the text box 322 to submit a message indicating why the user is requesting access to the site. The screen display 300B also presents a UI control 324 for submitting the access request to the site owner 114 or other entity. It can be appreciated from the above description that selection of the UI control 324 by the user can submit or generate the request 110 described herein and corresponding to a site access request, in some embodiments. It also can be understood from the description herein that if the user returns to the site or page before access is granted, the UI illustrated in FIG. 3A can be presented to the user to provide a status and/or history associated with the access request.

Figure 4:
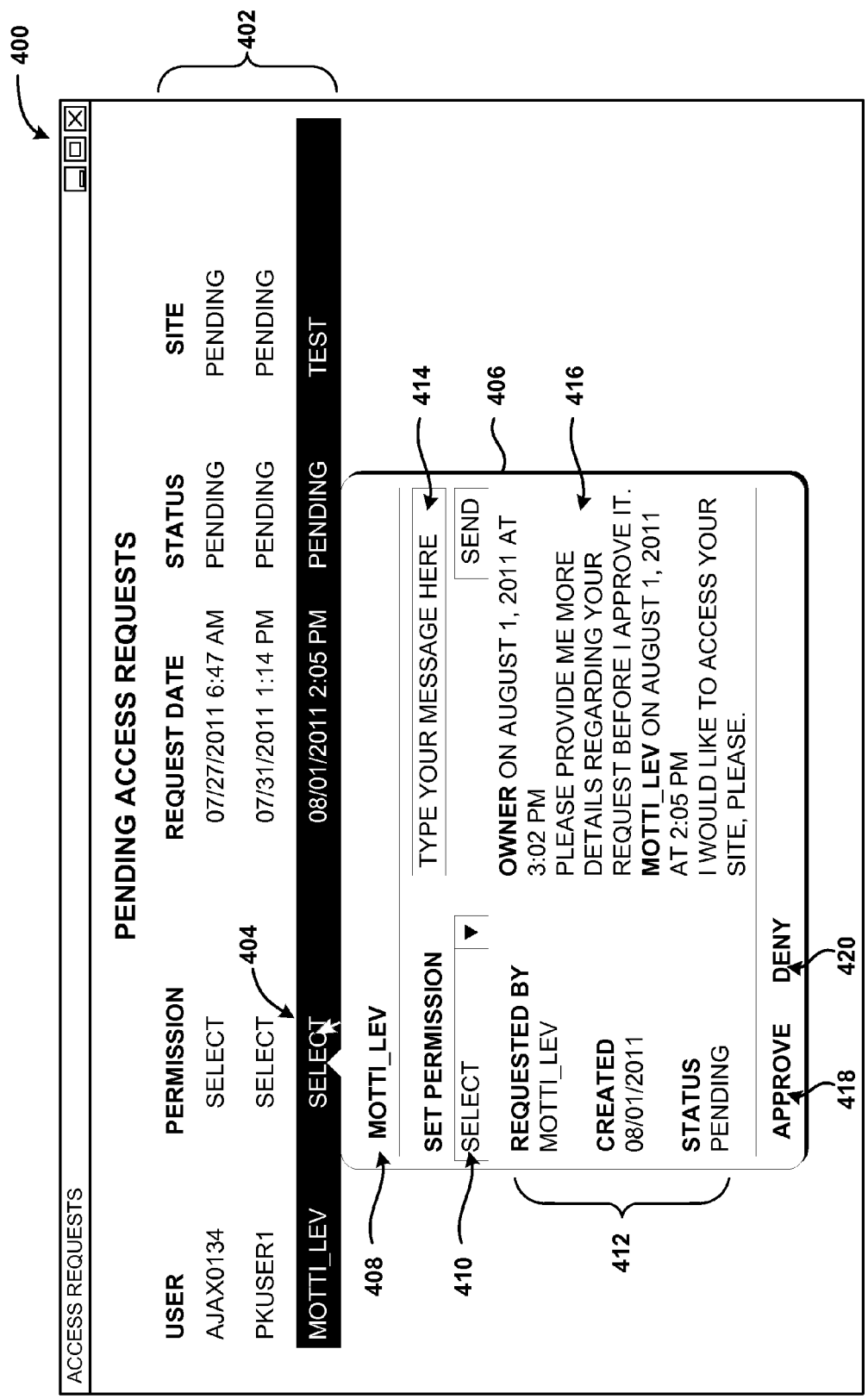
FIG. 4 is a user interface diagram showing aspects of an illustrative user interface for managing site access requests, according to an illustrative embodiment.

Turning now to FIG. 4, a UI diagram showing aspects of a UI for managing site access requests in some embodiments will be described in detail. The UI illustrated in FIG. 4 can be, but is not necessarily, presented to an owner, a site operator, or other entity for acting on access requests submitted to the server computer 108. In particular, FIG. 4 shows a screen display 400 generated by the server computer 108 to present a UI for a site owner 114 or other entity to review pending access requests, to send and/or receive messages to and from the user requesting access, to review information associated with the request, and/or to approve or deny the requests, among other functions. It should be appreciated that the UI diagram illustrated in FIG. 4 is illustrative of one contemplated embodiment, and therefore should not be construed as being limited in any way.

The screen display 400 includes a pending requests list 402 for listing pending requests. The pending requests list 402 can include various data associated with the access requests including, but not limited to, a request date, a current status of the request, a site, address, or other resource associated with the access request, a user associated with the access request, a permission granted, and/or other information (not illustrated). In some embodiments, including the illustrated embodiment, the displayed permission can be a UI control, the selection of which displays additional information associated with the access request and/or allows the user or other entity to set permission levels, send messages, review messages, and the like. In the embodiment illustrated in FIG. 4, the owner or other entity has hovered a selector such as a mouse pointer over, or selected via an input device, the UI control 404 for accessing additional information and/or setting a permission level for the access request associated with the user "MOTTI_LEV." It should be understood that this embodiment is illustrative, and should not be construed as being limiting in any way.

In response to selecting or hovering over the UI control 404, a detail window 406 is displayed. The detail window 406 includes an indicator 408 for displaying a user associated with the request. The detail window 406 also includes a UI control 410 for setting a permission level. In some embodiments, selection of the UI control 410 displays a drop down window, combo box, or other UI control for selecting or specifying a granted permission level or permission group. It should be understood that this embodiment is illustrative, and should not be construed as being limiting in any way.

The detail window 406 also displays a request status area 412 for displaying information associated with the access request. For example, the request status area 412 can display who requested the access request, when the access request was created, and a current status of the access request, if desired. In some embodiments, the party requesting the access for the user is the user him- or herself, while in other embodiments, another user may request access for the user. Thus, while the user indicated by the indicator 408 and the user indicated as requesting the access in the request status area 412 are illustrated as being the same, it should be understood that this is not necessarily the case. Thus, the illustrated embodiment should be understood as being illustrative and should not be construed as being limited in any way.

The detail window 406 also includes a text box 414 for generating messages to the user requesting access to the site and/or to the user for whom access is being requested. Thus, the site owner 114 or other entity can communicate with the user or other party to obtain additional information regarding the request, to send status update messages, and/or for other purposes, if desired. In some embodiments, the detail window 406 displays a message thread 416 for displaying a history of messages exchanged between the user and the site owner 114 or other entity. The detail window 406 also can display UI controls 418, 420 for approving or denying the requests from or made on behalf of users. It should be understood that this embodiment is illustrative, and should not be construed as being limiting in any way.

In some embodiments, the site owner 114 or other entity interacts with the site access requests via the UI illustrated in FIG. 4. Thus, in some embodiments the UI illustrated in FIG. 4 is used by a site owner 114 or other entity to interact with users or requestors without exposing his or her identity or other information, though this is not necessarily the case. Thus, the site owner 114 or other entity can, by way of interacting with the UI illustrated in FIG. 4, act on any site requests pending with the server computer 108.

FIG. 5 illustrates an illustrative computer architecture 500 for a device capable of executing the software components described herein for providing status of site access requests. Thus, the computer architecture 500 illustrated in FIG. 5 illustrates an architecture for a server computer, a personal computer, and/or another suitable computing device for providing the functionality described herein with respect to the server computer 108 and/or the user device 102. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514, the application programs 106, the server application 112, and/or the lists 116.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for providing status of site access requests have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for providing information of access requests, the computer-implemented method comprising performing computer-implemented operations for:
   identifying a user associated with an access request to access a server application, wherein identifying the user is based, at least partially, upon detecting a login attempt by the user at the server application;
   providing the access request to a server computer hosting the requested server application;
   causing presentation of a server computer user interface on the server computer, wherein the server computer user interface displays:
      a pending request list of a plurality of user access requests that includes the access request,
      an indicator that indicates the user associated with the access request,
      a permission setting control that causes setting of a permission level of the access request,
      a request status area that displays a current status of the access request, and
      an access request message history that displays a history of messages exchanged with the user associated with the access request.

2. The method of claim 1, further comprising:
   accessing the pending request list stored at the server computer, the pending request list storing data corresponding to the access request;
   obtaining, via analysis of the data stored in the pending request list, the history of messages associated with access request; and
   providing the current status associated with the access request to a client device associated with the user.

3. The method of claim 2, wherein providing the current status comprises generating a current status indicator for display on a client device user interface.

4. The method of claim 3, wherein providing the current status further comprises presenting the history of messages between the user and an entity associated with the server application.

5. The method of claim 3, wherein the client device user interface is a first client device user interface, and wherein the method further comprises:

presenting a second user interface to the user, the second user interface comprising an indication that access to the server application is denied; and
presenting a user interface control that is selectable for requesting access to the server application.

6. The method of claim 5, wherein the access request is a first access request, and the method further comprises:
   receiving a second access request from the client device associated with the user via the second user interface; and
   storing data associated with the second access request in a data file.

7. The method of claim 6, wherein storing the data associated with the second access request comprises storing the data in a second list stored at the server computer.

8. The method of claim 7, wherein the second list comprises a SHAREPOINT list.

9. The method of claim 6, further comprising:
   generating a second status update indicating a second current status of the second access request; and
   transmitting the second status update to the user.

10. The method of claim 9, wherein transmitting the second status update comprises causing transmission of an email to the client device associated with the user, the email comprising data indicating the current status of the second access request.

11. The method of claim 1, further comprising detecting that the user has attempted to access the server application.

12. A computer-implemented method for providing information of access requests, the computer-implemented method comprising performing computer-implemented operations for:
   detecting a user presenting an access request to a server application on a server computer, wherein identifying the user is based, at least partially, upon detecting a login attempt by the user at the server computer;
   identifying an identity of the user attempting to access the server application based, at least partially, upon a login associated with the user;
   presenting the access request to a server computer hosting the requested server application;
   causing presentation of a server computer user interface on the server computer, wherein the server computer user interface displays:
      a pending request list of a plurality of user access requests that includes the access request,
      an indicator that indicates the user associated the access request,
      a permission setting control that causes setting of a permission level of the access request,
      a request status area that displays a current status of the access request, and
      an access request message history that displays a history of messages exchanged with the user associated with the access request.

13. The method of claim 12, further comprising:
   accessing data stored at the server computer, the data corresponding to the presented access request;
   obtaining, via analysis of the data, the history of messages associated with the presented access request; and
   providing the current status associated with the presented access request to the user.

14. The method of claim 13, wherein the data corresponds to a SHAREPOINT list for storing data associated with the plurality of access requests.

15. The method of claim 12, further comprising:
presenting a user interface, in response to determining that no existing access request is associated with the user;
presenting an indication that the access request to the server application is denied; and
presenting a user interface control that is selectable for requesting access to the server application.

16. The method of claim 15, further comprising:
receiving a second access request from the user via the user interface; and
storing data associated with the second access request in a SHAREPOINT list stored at the server computer.

17. The method of claim 16, further comprising:
generating a second status update comprising data indicating a second current status of the second access request; and
causing the transmission of the second status update to the user, wherein the second status update is transmitted to the user within an email message.

18. One of an optical storage disk, a magnetic storage device or a solid state storage device having computer readable instructions stored thereupon that, when executed by a computer, cause the computer to:
detect a user presenting an access request to a server application hosted by a server computer, wherein detecting the user is based, at least partially, upon detecting a login attempt by the user at the server application;
identify an identity of the user presenting the access request to access the server application based, at least partially, upon a login associated with the user;
presenting the access request to the server computer hosting the requested server application;
causing presentation of a server computer user interface on the server computer, wherein the server computer user interface displays
a pending request list of a plurality of user access requests that includes the presented access request,
an indicator that displays the user associated the presented access request,
a permission setting control that causes setting of a permission level of the presented access request,
a request status area that displays a current status of the presented access request, and
an access request message history that displays a history of messages exchanged with the user associated with the presented access request.

19. The optical storage disk, magnetic storage device or solid-state storage device of claim 18, further comprising computer-executable instructions that, when executed by the computer, cause the computer to:
receive the access request from the user via a user interface; and
store data associated with the access request at the server computer;
generate a status update comprising data indicating the current status of the access request; and
causing the transmission of the status update to the user, wherein the status update is transmitted to the user within an email message.

* * * * *